Patented Jan. 8, 1929.

1,698,238

UNITED STATES PATENT OFFICE.

CLAUDE G. MINER, OF BERKELEY, CALIFORNIA.

PROCESS FOR PRODUCING ALUMINUM CHLORIDE.

No Drawing.   Application filed May 19, 1927.  Serial No. 192,788.

The catalytic properties of anhydrous aluminum chloride for cracking oil are well known, and it is realized that there are many processes out for its production. However there seems to be some drawback, either by way of costs or technique.

I have discovered what I believe to be a simple and inexpensive way of producing the anhydrous aluminum chloride.

I find that at the temperature of the electric furnace dry hydrochloric acid gas will act upon aluminous materials in the presence of a carbonaceous material to give anhydrous aluminum chloride. It is known that dry hydrochloric acid gas will not act upon alumina and carbon even at a moderate high temperature. For illustration, I have passed dry hydrochloric acid gas over a mixture of alumina and coke at 1200° C. without obtaining any appreciable amount of the chloride.

I find, however, that if this temperature is raised that the chloride begins to form around 1500° C. In practice, I prefer a temperature of 1700° to 2000° C. but do not limit myself to these temperatures. Higher temperatures are not injurious except that it is a waste of energy.

In case bauxite or alunite residue is used as the source of alumina, I use a slight excess of coke, 5 to 10%, over that required by the following:

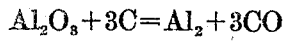

In case clay is used, certain decided advantages result. It permits of a cheap source of alumina and a by-product of silicon or silicon alloys can be obtained. For illustration, if the formula for clay is taken as $Al_2O_3.3SiO_2$, the reaction with coke in the electric furnace would be as follows:

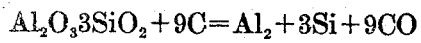

In this case, I find that aluminum chloride is formed but that the hydrochloric acid gas does not act to form silicon chloride. Instead therefor, there is formed silicon. It follows that if iron is present that iron chloride will result also. Hence with clay, anhydrous aluminum chloride and metallic silicon can be formed with the one operation.

In practice, I prefer to use pulverized aluminous material and coke in a rotary electric furnace. The aluminous material can be preheated with the waste gases if desired. The mixture of aluminous material and coke meets a countercurrent of hydrochloric acid gas. In this way all of the acid gas is used up, none escaping out with the volatilized aluminum chloride.

The aluminous material and coke can be made into briquets and heated in an arc type furnace or by well known resistance type furnaces. For this high temperature, however, an arc type would doubtless prove more suitable.

One advantage of this process is the fact that it permits of the alumina and hydrochloric acid gas from the oil sludge, produced for example in oil cracking processes using aluminum chloride as a catalyst or reagent, being readily used over again. For illustration, I would run the oil sludge to a coke residue. This residue I would then treat with just enough steam at 200° to 500° C. to form dry hydrochloric acid gas, which is used for treating the next charge of aluminous material and coke in the electric furnace. The remaining coke residue can then be used for heat purposes and just enough coke left with the alumina for the next reaction in the electric furnace. In this way, both the alumina and hydrochloric acid gas are kept in the cycle, and it is not necessary to go through the expensive Deacon or similar process to obtain chlorine from the acid before treatment of the alumina.

Having described my invention what I claim is:

1. The process of producing aluminum chloride from aluminous material which comprises reacting upon the aluminous material, in the presence of carbon, at a temperature of at least about 1500° C., with hydrochloric acid.

2. The process of producing aluminum chloride from aluminous material which comprises reacting upon the aluminous material, in the presence of carbon, at a temperature of 1700 to 2000° C., with hydrochloric acid.

3. The process of producing aluminum chloride by interaction of aluminous material, a reducing agent and hydrochloric acid at a temperature above approximately 1500° C.

4. The process of producing aluminum chloride by interaction of aluminous material, carbon and hydrochloric acid at a temperature above approximately 1500° C.

5. The process of producing aluminum chloride which comprises reacting upon aluminum oxide, in the presence of carbon, at a temperature of at least about 1500° C., with hydrochloric acid.

6. The process of producing aluminum chloride which comprises reacting upon aluminum oxide in the presence of carbon, at a temperature of 1700° to 2000° C., with hydrochloric acid.

7. The process of producing aluminum chloride by interaction of aluminum oxide, a reducing agent and hydrochloric acid at a temperature of at least 1500° C.

8. The process of producing aluminum chloride by interaction of aluminum oxide, carbon and hydrochloric acid at a temperature above approximately 1500° C.

In testimony whereof I affix my signature.

CLAUDE G. MINER.